Figure 8:
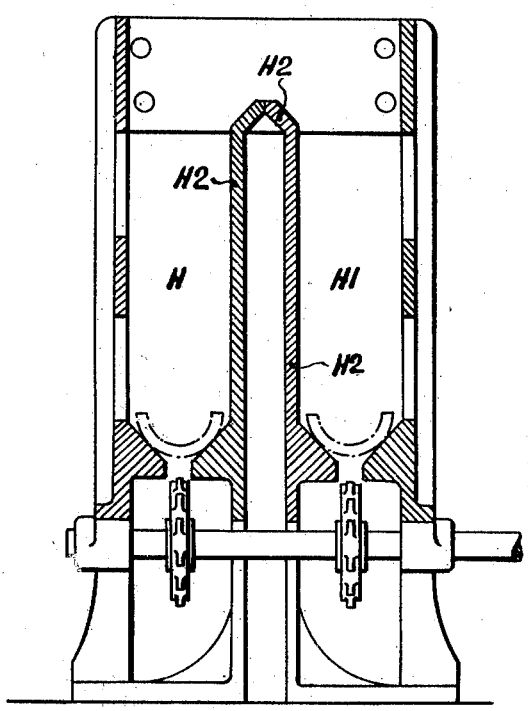

J. L. JARDINE.
APPARATUS FOR PREPARING BAMBOO AND KINDRED MATERIAL FOR PULP EXTRACTION, &c.
APPLICATION FILED NOV. 26, 1919.
1,372,512.
Patented Mar. 22, 1921.
4 SHEETS—SHEET 1.
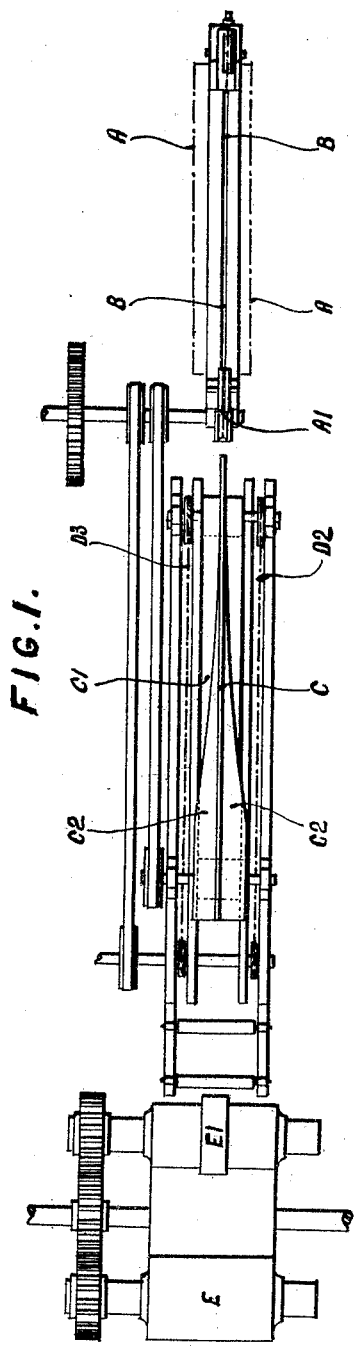
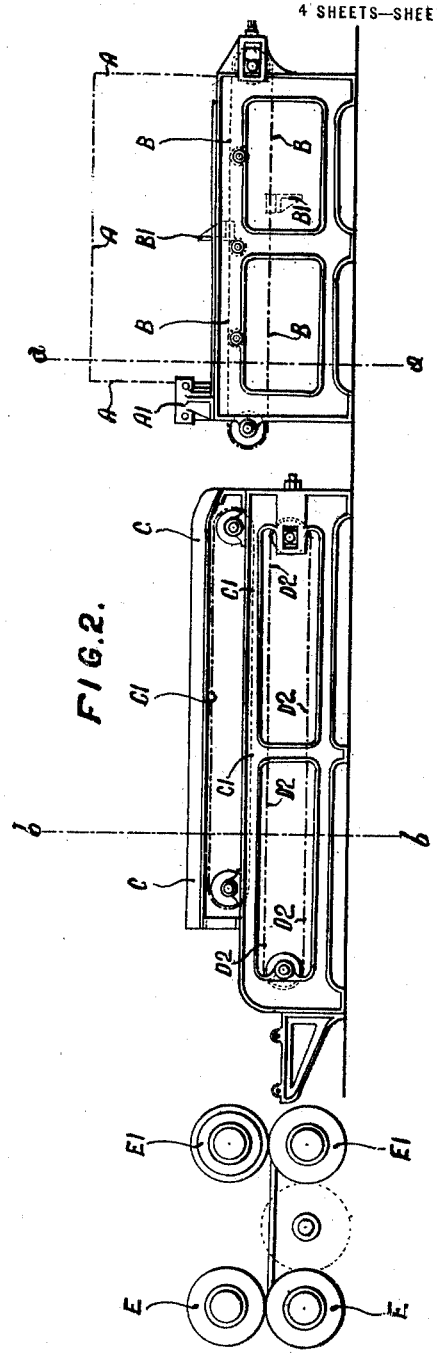
INVENTOR
JAMES L. JARDINE
BY Strom and Strom
ATTORNEYS

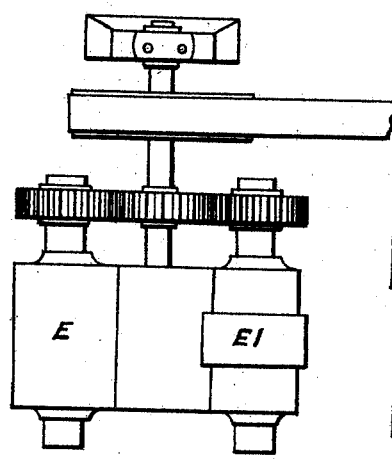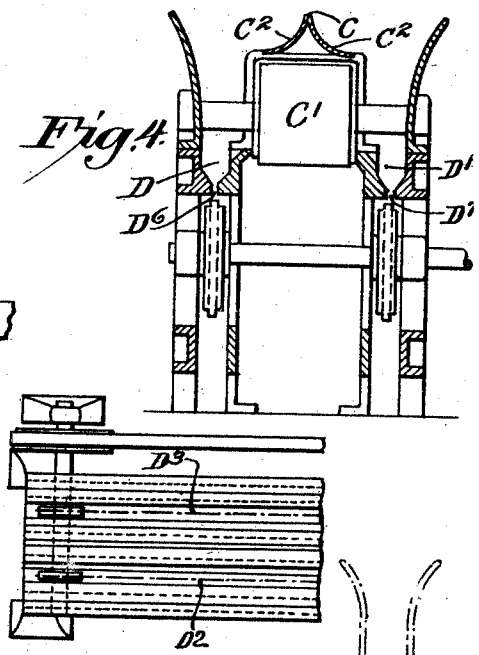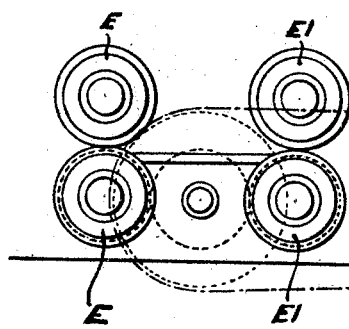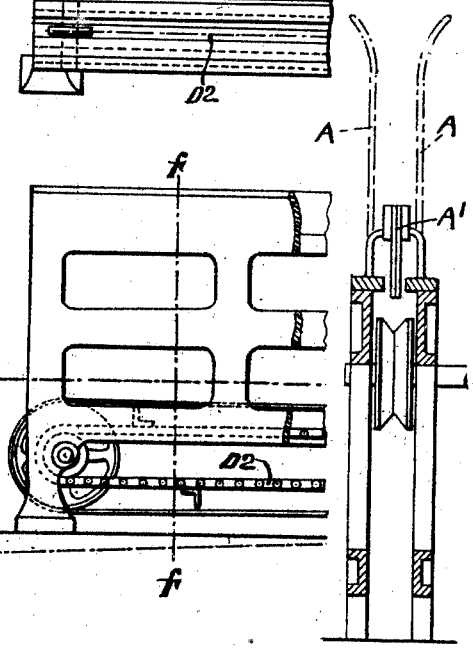

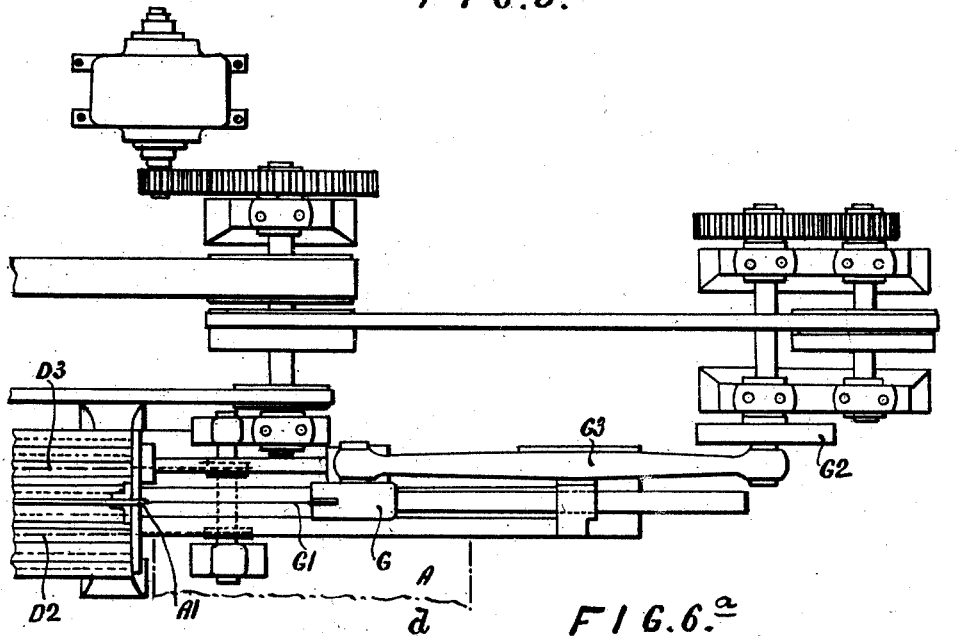
FIG. 5.ᵃ
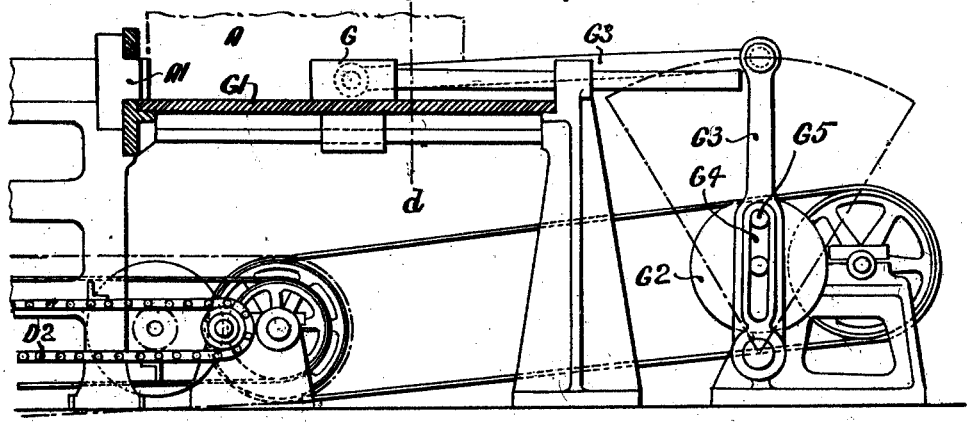
FIG. 6.ᵃ

J. L. JARDINE.
APPARATUS FOR PREPARING BAMBOO AND KINDRED MATERIAL FOR PULP EXTRACTION, &c.
APPLICATION FILED NOV. 26, 1919.

1,372,512.

Patented Mar. 22, 1921.
4 SHEETS—SHEET 4.

INVENTOR
James Lockhart Jardine
By Howson and Howson
ATTORNEYS

UNITED STATES PATENT OFFICE.

JAMES LOCKHART JARDINE, OF PENICUIK, SCOTLAND.

APPARATUS FOR PREPARING BAMBOO AND KINDRED MATERIAL FOR PULP EXTRACTION, &c.

1,372,512. Specification of Letters Patent. Patented Mar. 22, 1921.

Application filed November 26, 1919. Serial No. 340,873.

*To all whom it may concern:*

Be it known that I, JAMES LOCKHART JARDINE, a subject of the King of Great Britain and Ireland, and a resident of Penicuik, Midlothian, Scotland, have invented certain new and useful Improvements in Apparatus for Preparing Bamboo and Kindred Material for Pulp Extraction or for Splitting and Flattening Such Material, of which the following is the specification.

The invention has for its object to provide simple and effective means for splitting lengths of bamboo and arranging the resultant half stems side by side at the proper distance apart for their presentation end on to crushing rolls, or alternatively, for splitting and flattening the stems and brushing their outer surfaces.

An apparatus made according to the invention comprises essentially a hopper device to receive the lengths of bamboo, and of such width that there is space for one length at a time at the bottom, a fixed knife opposite an aperture at one end of the hopper, means for forcing the length of bamboo endwise against the knife so that it is longitudinally split, and means beyond the knife for receiving the split portions and placing them at such a distance apart that they may then be presented to the crushing rolls—that is to say, at such a lateral distance apart that there is room for the fiber to spread out laterally in the crushing operation without overlapping, or alternatively, after the lengths of bamboo have been split, the resultant halves may be passed through two or more sets of pressure rollers to flatten them, and, in the inter-spaces between the pairs of rollers, brushes may be arranged for cleaning the outer surface of the bamboo.

In carrying out the invention, the means for forcing the lengths of bamboo against the knife may consist either of a plunger reciprocating in the bottom of the hopper and preferably operated by a "quick-return" motion, or of a conveyer belt, chain or chains passing along the bottom of the hopper (and, it may be, forming the lower parts of the sides thereof) and having upstanding fingers adapted to engage the ends of the lengths of bamboo.

The device for placing the halved stems side by side and which is arranged beyond the knife, consists of a central upright partition in line with the knife and curved channel-like guides on either side. A conveyer is arranged beneath the guides carrying feeding fingers which push forward the two sections of the bamboo stem. The half stems pass one on each side of the partition or guide vane, and when the stem has been completely pushed through the aperture in which is the knife, the half stems slide laterally down the guides and lie at the proper distance apart. The half stems are then pushed forward by conveyer fingers and may be fed directly to crushing rolls for thorough disintegration and the production of a texture ready for pulp extraction, or alternatively, as hereinbefore described, flattened and brushed.

Figure 7:
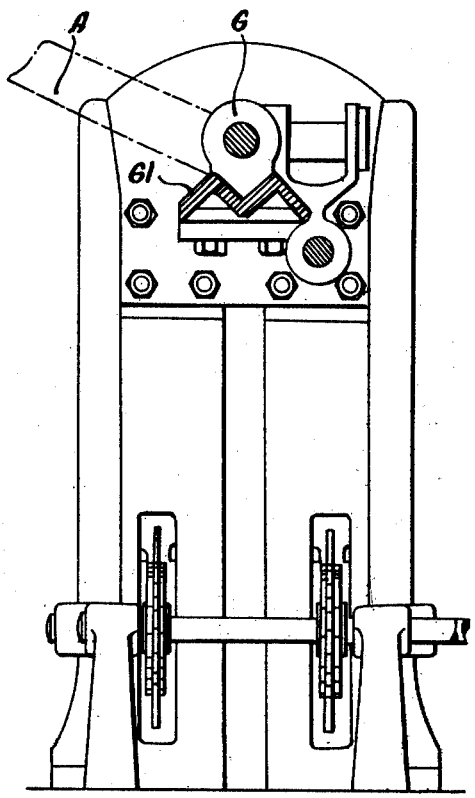

Two examples of the invention are shown on five accompanying sheets of explanatory drawings, Figures 1 1$^a$ and 2 2$^a$, Sheets 1 and 2, being respectively a plan and an elevation, the entrant end of the machine in each figure being shown on Sheet 2 and the continuation thereof on Sheet 1, while Figs. 3 and 4 are sectional elevations to a larger scale on the lines $a$—$a$ and $b$—$b$ Fig. 2, and sufficient to show one example. Figs. 5 5$^a$ and 6 6$^a$, Sheets 3 and 4, are views similar to Figs. 1 and 2, while Figs. 7 and 8, Sheet 5, are sectional elevations on the lines $f$—$f$, Fig. 6 showing the second example.

As shown in Figs. 1 to 4 there is provided a hopper A to receive the lengths of bamboo and of such a width that there is space for only one length of bamboo at a time at the bottom of the hopper. At one end of the hopper and opposite an aperture in that end there is a fixed knife A$^1$. Each length of bamboo is forced by a conveyer B endwise through the aperture in the hopper A against the fixed knife A$^1$ so that it is longitudinally split. The conveyer B is arranged below and lengthwise of the hopper and carries fingers B$^1$ which work in the bottom of the hopper and engage the end of each length of bamboo as it falls to the bottom of the hopper.

After the bamboo has been longitudinally split by the knife A$^1$ the halved stems pass one on either side of a central upright partition C having a conveyer C$^1$ working below it. The partition C is arranged in line with the knife A$^1$ and has curved channel-like guides C$^2$ on either side of it. After the bamboo has passed the knife A¹ the conveyer C¹ conveys it along the channel-like guides C² until the halves are at a proper distance apart when they fall from the guides C² and lie in channels D, D¹ arranged one on either side of and beneath the level of the guides C². Beneath the channels D, D¹, there are arranged conveyers D², D³, having fingers adapted to work in slots D⁶, D⁷, in the bottom of the channels D, D¹, and to engage the split stems. Opposite the forward end of the channels D, D¹, there are arranged two pairs of crushing rollers E, E¹, which receive the half stems as they are fed forward by the conveyer fingers and so far crush them that they are in a condition for treatment in apparatus such as that described in the specification of my former U. S. Patent application, Serial No. 280571, 4th March, 1919, for the production of a material suitable for pulp extraction.

In the examples shown in Figs. 5 to 8, the bamboo as it falls to the bottom of the hopper A is forced against the fixed knife A¹ by means of a reciprocating plunger G sliding on a guide G¹. The plunger G is actuated from a disk G² by means of a bell-crank lever G³ one arm of which has in it a slot G⁴ within which works a pin G⁵ on the disk G². After the bamboo passes the knife A¹ the half stems are received in channels H, H¹, one on either side of a central partition H² in line with the knife A¹. As hereinbefore described the half stems are fed from the channels H, H¹, to the crushing rollers E, E¹, by means of the conveyers D², D³.

What I claim is:—

1. In apparatus for preparing bamboo and kindred material for pulp extraction, or for splitting and flattening such material, a feeding hopper arranged to deliver bamboo stems one at a time in line with a fixed knife opposite one end of the feeding hopper, means for forcing the lengths of bamboo endwise against the knife, and means beyond the knife for receiving and spacing apart the split portions substantially parallel to each other and in the direction of the feed to the knife for presentation to crushing or like rolls.

2. In apparatus of the class described, a hopper adapted to receive the lengths of bamboo and of such a width that there is space for one length at a time at the bottom thereof, a fixed knife opposite an aperture at one end of the hopper, a conveyer beneath the hopper, fingers on the conveyer working within the hopper and engaging one end of the bamboo, a central upright partition in line with the knife, curved channel-like guides on the partition, a conveyer beneath the partition, a channel on either side of the partition, slots in the bottom of the channels, conveyers beneath the channels and fingers on the conveyers working in the slots in the channels, and engaging the split portions of the stems, as described.

3. The combination with apparatus as specified in claim 1, of crushing rolls arranged on axes substantially at right angles to the direction of the feed of the stems to the knife and spreader, and means for feeding the spaced stem splits to said rolls.

4. In apparatus for preparing canes for pulp extraction, a splitting knife, means for forcing a cane endwise against the same to split the cane, flattening rolls, and means for delivering cane splits thereto in laterally spaced and substantially parallel relation to each other.

5. In apparatus for preparing canes for pulp extraction, a cane hopper having a bottom width only slightly in excess of the thickness of a single cane, a splitting knife arranged at the delivery end of the hopper, and means for engaging and forcing the bottom cane in the hopper against said knife to split the cane, flattening rolls, and means for delivering thereto the cane splits in spaced and substantially parallel relation.

6. In apparatus for preparing canes for pulp extraction, a splitting knife, means for forcing a cane endwise against the same to split the cane, guide means for spreading apart the cane splits, flattening rolls, and means for feeding the spread and substantially parallel cane splits to the flattening rolls.

In testimony whereof I have signed my name to this specification.

JAMES LOCKHART JARDINE.